May 10, 1938.  J. R. AUSTIN ET AL  2,117,234
EMERGENCY BALANCING MEANS
Filed Feb. 19, 1937  2 Sheets-Sheet 1

INVENTORS.
JONATHAN R. AUSTIN
DONOVAN R. BERLIN
BY
ATTORNEYS.

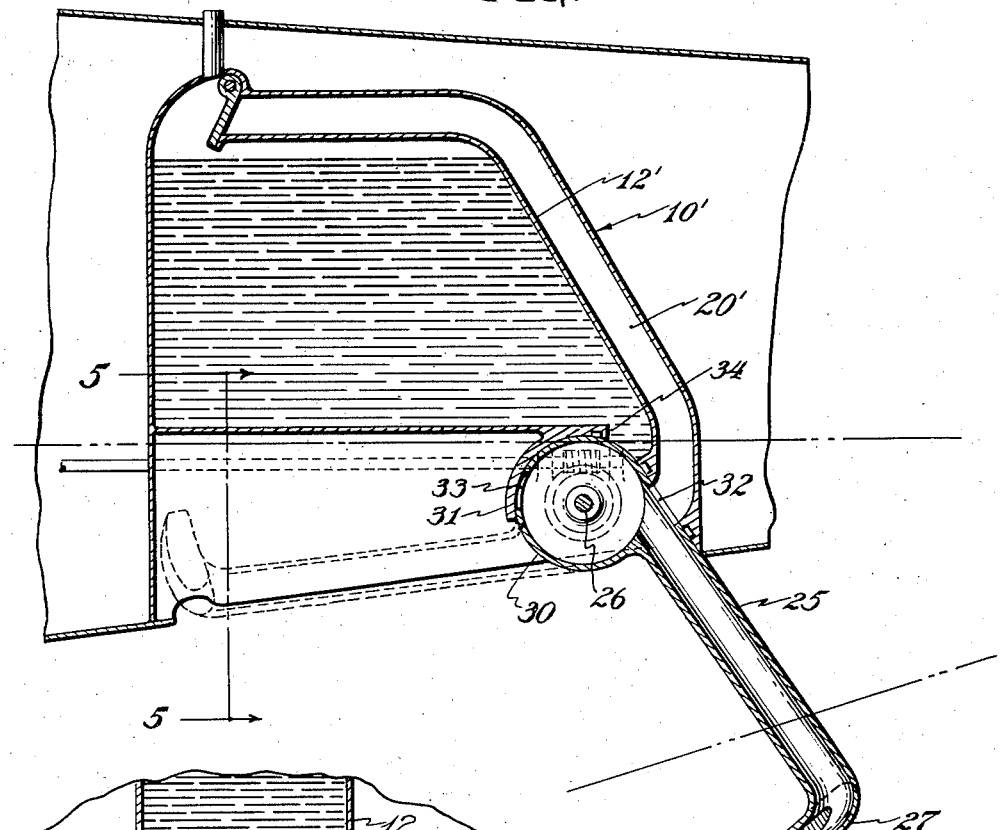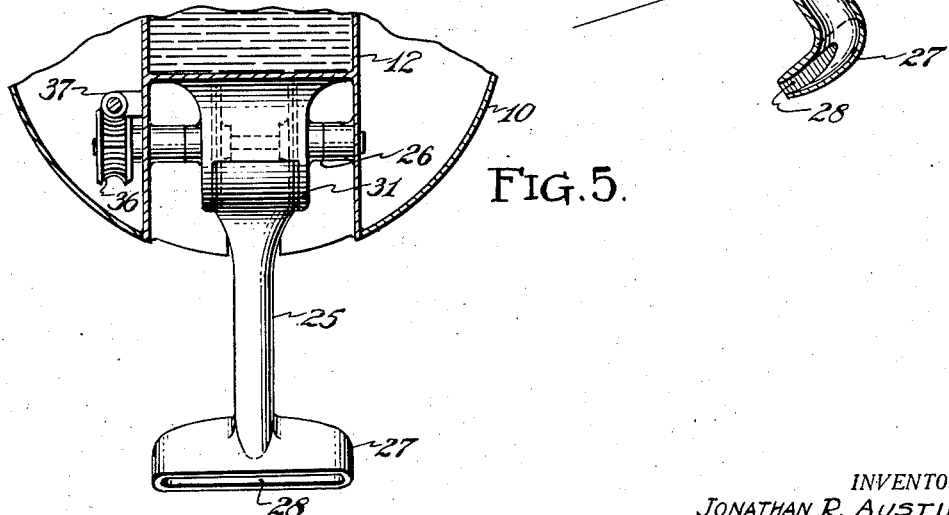

Patented May 10, 1938

2,117,234

UNITED STATES PATENT OFFICE 2,117,234

EMERGENCY BALANCING MEANS

Jonathan R. Austin, Dayton, Ohio, and Donovan R. Berlin, Eggertsville, N. Y.

Application February 19, 1937, Serial No. 126,568

3 Claims. (Cl. 244—94)

This invention concerns aircraft, and relates particularly to balancing means for use in conjunction with emergency flotation apparatus.

Frequently, aircraft equipped for land operation are used in marine operations, and it has become relatively common to provide such aircraft with emergency flotation apparatus in the case of forced landings upon the water. Such apparatus comprises inflatable rubber or fabric bags normally contained within the confines of the aircraft and also, watertight air tanks within the aircraft and its wings which are capable of sustaining the craft upon the surface of the water. Ordinarily, this flotation apparatus is so disposed with respect to the center of gravity of the aircraft that the latter is nose-heavy when floating on the water, resulting in the aircraft assuming a position with its nose under water and its tail in the air, with the center line of the aircraft inclined at about 30° to the surface of the water. It is more desirable to have the aircraft float on or as near to an even keel as possible, and to prevent the nosing down condition. Accordingly, it is an object of this invention to provide a ballasting device toward the tail of an aircraft which will assist in maintaining the craft on an even keel when it is floating upon the surface of the water after an emergency landing has been made.

In landing a land plane upon the water, the normal technique is to bring the craft to a nearly stalled condition, and to "pancake" the craft upon the water with the tail down. The tendency, however, upon hitting the water, is for the nose of the aircraft to sink and accordingly, we provide in addition to the ballast organization, a scoop near the tail of the aircraft which may be lowered to hold the tail of the craft down while the aircraft still has forward speed.

A further object of the invention is to provide a selectively operable hydroplane or scoop which serves to hold the tail of a landing plane down when an emergency landing upon water is being made.

A still further object is to combine the hydroplane and ballasting tank organization into a single unit, and to provide means for filling the ballast tank which is coordinated with the scoop.

Further objects will be apparent from a reading of the subjoined specification and claims, and from an examination of the accompanying drawings, in which like numerals indicate similar parts, and in which:

Fig. 4 is an enlarged section through an alternative embodiment of the invention, and Fig. 5 is a section on the line 5—5 of Fig. 4.

Figure 1:
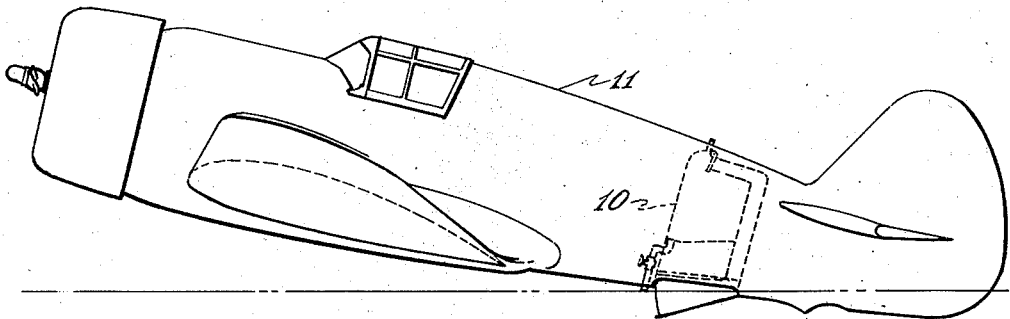
Fig. 1 is a side elevation of a low wing monoplane with landing gear retracted, in the attitude which would normally be used in making an emergency water landing, the aircraft including the devices of this invention.
Figure 2:
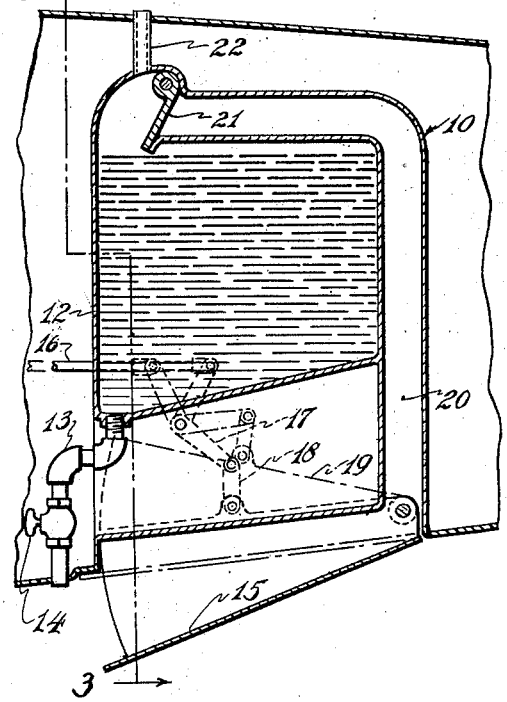
Fig. 2 is an enlarged sectional view of a ballast tank and scoop organization.
Figure 3:
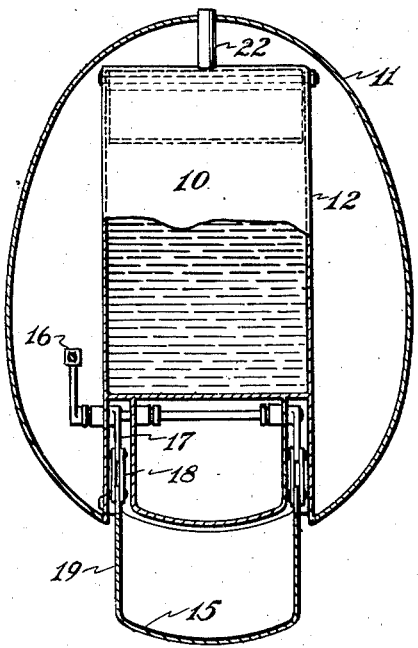
Fig. 3 is a section on the line 3—3 of Fig. 2.

The invention comprises essentially a ballast tank and scoop organization 10 installed in the rearward part of an aircraft fuselage 11, the aircraft being of the type adapted for normal land operation and being equipped with a wheeled landing gear, retractable or otherwise. It is presumed that the aircraft is equipped with emergency flotation means such as sealed tanks within the aircraft, or inflatable bags of a character well known in the art. The unit 10, as shown in Figs. 2 and 3, comprises a tank 12 disposed above the normal water line of the aircraft when the latter is floating upon the water, the tank being provided with a drain pipe 13 and drain cock 14. The unit structure 10 also includes a scoop 15 which normally lies flush with the bottom of the fuselage, but which may be lowered to the position shown in full lines in the figures, so that the scoop acts as a hydroplane tending to keep the tail of the craft down when the latter is moving. The scoop is selectively moved between retracted and extended positions by means of an operating rod 16 extending to the crew's quarters, the rod being connected to a bellcrank 17 linked at 18 to side plates 19 of the scoop. The unit 10 is provided with a duct 20 leading from the rearward part of the scoop 15 upwardly and forwardly to the top of the tank 12, and if desired, a check valve 21 may be placed in the duct, and an air vent 22 should be provided for the tank. Upon impact of the aircraft tail with the water, water is forced into the scoop 15, up the duct 20 and into the tank 12, quickly filling the latter, since the forward speed of the aircraft is ordinarily sufficiently great to drive water through the duct 20 in more than sufficient amount. When the tank and duct become full, further flow of water in the duct may not occur, since the system is substantially closed except for the vent 22.

In Figs. 4 and 5 we show an alternative arrangement wherein the scoop is replaced with a tubular member 25 pivoted at 26 to the aircraft, the tube, at its lower end, being provided with a hydroplane element 27 having a negative angle of attack with respect to the water. Accordingly, when the plane 27 strikes the water and submerges, it will exert a strong force tending to pull the tail of the aircraft down when the aircraft is in motion. The plane 27 is provided with a duct 28 leading into the hollow of the tube 25, this hollow communicating with the duct 20' in the unit 10' so that water entering the plane 27 is conducted to the tank 12' to fill same as previously described.

The pivot 26 includes an automatic valve organization, wherein a hollow housing 30 forms a hub for the tube 25, the hub 30 being journaled in a casing 31 forming the lower part of the tank 12'. The hub 30 is provided with an opening 32 to establish communication between the hollow of the tube 25 and the duct 20' when the tube 25 is extended. Likewise, the hub is provided with a port 33 registerable with a port 34 in the bottom of the tank when the tube 25 is retracted. Suitable means such as the worm wheel 36 and worm 37 are provided to turn the hub 30 about its pivot axis, so that the tube 25 may be moved between extended and retracted positions. In normal flight, the tube 25 is retracted, whereby the ports 33 and 34 are in registry, and any water in the tank 12' may drain therethrough, to drop from the aircraft through the opening 32 which, when the hook is retracted, is open to the atmosphere. If an emergency landing is to be made, the aircraft crew extends the tube 25 by operating the worm 37, whereupon the tank port 34 is closed, the hub port 33 is closed, and the hub opening 32 is placed in communication with the tank filling duct 20'. Upon striking the water, the hydroplane 27 holds the tail of the aircraft down, and at the same time, water is driven upwardly through the tube 25 to fill the ballast tank 12'. So long as the tube 25 remains extended, water will be held within the tank 12'. When the aircraft is taken from the water, the tube 25 may be retracted, whereupon the tank 12' is drained, as above described, in connection with the normal retracted position of the tube 25.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. A ballast apparatus for aircraft comprising a tank, a casing at the bottom of said tank with which said tank communicates, a duct leading from said casing to the top of said tank, a hollow hub journaled in said casing, and a tube on said hub communicating with the hollow thereof, said hub having openings registerable with said casing openings for draining said tank and for establishing a filling conduit including said tube and duct according to the position of said tube.

2. A ballast apparatus for aircraft comprising a tank, a valve housing at the bottom of said tank having a first opening leading to the bottom of the tank, a second opening leading to the top of the tank, and a drain opening, and a hollow valve body having a tube extending therefrom, said body having openings and being selectively adjustable to place said tube into communication with said second opening when the tube is substantially vertical, and to place said first opening into communication with the atmosphere when said tube is substantially horizontal.

3. In a ballast apparatus for aircraft, a ballast tank, a valve housing, connections from said housing to the top and bottom of the tank respectively and to the atmosphere, and a valve core including a fluid tube movable between extended and retracted positions, said valve core having openings so disposed as to connect with said housing openings in certain arrangements, said arrangements comprising a drain connection from the bottom of said tank to the atmosphere when the tube is retracted, and a filling connection from the tube to the top of said tank when the tube is extended.

JONATHAN R. AUSTIN.
DONOVAN R. BERLIN.